(12) United States Patent
Tanaka et al.

(10) Patent No.: US 10,559,835 B2
(45) Date of Patent: Feb. 11, 2020

(54) RESIN-FRAMED MEMBRANE-ELECTRODE ASSEMBLY FOR FUEL CELL

(71) Applicant: HONDA MOTOR CO., LTD., Tokyo (JP)

(72) Inventors: Yukihito Tanaka, Wako (JP); Naoki Mitsuta, Wako (JP); Seiji Sugiura, Wako (JP); Suguru Omori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 14/944,212

(22) Filed: Nov. 18, 2015

(65) Prior Publication Data

US 2016/0149232 A1 May 26, 2016

(30) Foreign Application Priority Data

Nov. 20, 2014 (JP) .................................. 2014-235550

(51) Int. Cl.
| | |
|---|---|
| *H01M 8/0273* | (2016.01) |
| *H01M 8/1004* | (2016.01) |
| *H01M 8/0284* | (2016.01) |
| *H01M 8/241* | (2016.01) |
| *H01M 8/02* | (2016.01) |
| *H01M 8/10* | (2016.01) |
| *H01M 8/0271* | (2016.01) |

(52) U.S. Cl.
CPC ....... *H01M 8/0273* (2013.01); *H01M 8/0284* (2013.01); *H01M 8/1004* (2013.01); *H01M 8/02* (2013.01); *H01M 8/0271* (2013.01); *H01M 8/10* (2013.01); *H01M 8/241* (2013.01); *H01M 2250/20* (2013.01); *Y02E 60/521* (2013.01); *Y02T 90/32* (2013.01)

(58) Field of Classification Search
None
See application file for complete search history.

(56) References Cited

U.S. PATENT DOCUMENTS

2013/0183604 A1* 7/2013 Tanaka ................ H01M 8/0289
429/480

FOREIGN PATENT DOCUMENTS

| JP | 2007-066766 | 3/2007 |
|---|---|---|
| JP | 2013-098155 | 5/2013 |

(Continued)

*Primary Examiner* — Haixia Zhang
(74) *Attorney, Agent, or Firm* — Mori & Ward, LLP

(57) ABSTRACT

A resin-framed membrane-electrode assembly for a fuel cell includes a stepped membrane-electrode assembly and a resin frame member. The stepped membrane-electrode assembly includes a polymer electrolyte membrane, a first electrode, and a second electrode. The resin frame member surrounds an outer perimeter of the polymer electrolyte membrane and includes an inner perimeter base end and an inner protruding portion. The inner protruding portion includes a flat surface portion which extends to face an outer perimeter surface portion of a second surface of the polymer electrolyte membrane and on which an adhesive layer is provided so that the adhesive layer lies at least between the flat surface portion and the outer perimeter surface portion. The adhesive layer has a tapered shape in which a thickness of the adhesive layer increases from a tip of the inner protruding portion toward the inner perimeter base end.

10 Claims, 8 Drawing Sheets

(56) References Cited

FOREIGN PATENT DOCUMENTS

| JP | 2013-131417 | 7/2013 |
| JP | 2013-145653 | 7/2013 |
| JP | 2014-017150 | 1/2014 |
| JP | 2014-137936 | 7/2014 |
| JP | 2015-076286 | 4/2015 |
| JP | 2015-090793 | 5/2015 |
| JP | 2015-125926 | 7/2015 |

* cited by examiner

BACKGROUND ART

RESIN-FRAMED MEMBRANE-ELECTRODE ASSEMBLY FOR FUEL CELL

CROSS-REFERENCE TO RELATED APPLICATIONS

The present application claims priority under 35 U.S.C. § 119 to Japanese Patent Application No. 2014-235550, filed Nov. 20, 2014, entitled "Resin-Framed Membrane-Electrode Assembly For Fuel Cell." The contents of this application are incorporated herein by reference in their entirety.

BACKGROUND

1. Field

The present disclosure relates to a resin-framed membrane-electrode assembly for a fuel cell.

2. Description of the Related Art

Typical solid polymer electrolyte fuel cells use polymer electrolyte membranes formed of polymer ion exchange membranes. A fuel cell includes a membrane-electrode assembly (MEA) constituted by a polymer electrolyte membrane, an anode electrode disposed on one side of the polymer electrolyte membrane, and a cathode electrode disposed on the other side of the polymer electrolyte membrane. The anode electrode and the cathode electrode each include a catalyst layer (electrode catalyst layer) and a gas diffusion layer (porous carbon).

A membrane-electrode assembly sandwiched between separators (bipolar plates) constitutes a fuel cell. A desired number of fuel cells are stacked to form, for example, an onboard fuel cell stack to be used in vehicles.

The membrane-electrode assembly may come in a form of a so-called stepped MEA in which one of the gas diffusion layers is designed to be have smaller planar dimensions than the polymer electrolyte membrane, and the other gas diffusion layer is designed to have the same planar dimensions as the polymer electrolyte membrane. In order to reduce the amount of a relatively expensive polymer electrolyte membrane used and protect the polymer electrolyte membrane which is thin and has a low strength, a resin-framed MEA having a built-in resin frame member around the outer perimeter is used.

An example of the resin-framed MEA is a membrane-electrode assembly disclosed in Japanese Unexamined Patent Application Publication No. 2007-66766. According to this membrane-electrode assembly shown in FIG. 8, an anode catalyst layer 2a and an anode gas diffusion layer 2b both having the same external dimensions as a membrane 1 are disposed on one side of the membrane 1. A cathode catalyst layer 3a and a cathode gas diffusion layer 3b both having smaller external dimensions than the membrane 1 are disposed on the other side of the membrane 1. As a result, a stepped MEA 4 is constructed.

The anode gas diffusion layer 2b is designed to have a larger area than the cathode gas diffusion layer 3b. The membrane 1 has an outer perimeter portion located at the cathode gas diffusion layer 3b side, and the outer perimeter portion is bonded to a gasket structure 5 with a bonding part 6.

According to this patent document, the outer perimeter portion (flat surface) of the membrane 1 located at the cathode gas diffusion layer 3b side is bonded to a flat surface of an inner perimeter thin portion 5a of the gasket structure 5 with the bonding part 6 which has a frame-like planar shape.

SUMMARY

According to one aspect of the present invention, a resin-framed membrane-electrode assembly for a fuel cell includes a stepped membrane-electrode assembly and a resin frame member. The stepped membrane-electrode assembly includes a polymer electrolyte membrane, a first electrode disposed on a surface of the polymer electrolyte membrane, and a second electrode disposed on another surface of the polymer electrolyte membrane. The first electrode has planar dimensions larger than planar dimensions of the second electrode. The resin frame member surrounds an outer perimeter of the polymer electrolyte membrane. The resin frame member includes an inner protruding portion that has a small thickness and protrudes from an inner perimeter base end toward a second electrode side. The inner protruding portion includes a flat surface portion on which an adhesive layer is formed so that the adhesive layer lies between the flat surface portion and an outer perimeter surface portion of the polymer electrolyte membrane. The outer perimeter surface portion at least extends outward in a surface direction from an end of the second electrode so as to be exposed from the second electrode. The adhesive layer has a tapered shape in which a thickness increases from a tip of the inner protruding portion toward the inner perimeter base end of the inner protruding portion.

According to another aspect of the present invention, a resin-framed membrane-electrode assembly for a fuel cell includes a stepped membrane-electrode assembly and a resin frame member. The stepped membrane-electrode assembly includes a polymer electrolyte membrane, a first electrode, and a second electrode. The polymer electrolyte membrane has a first surface and a second surface which is opposite to the first surface and which has an outer perimeter surface portion. The first electrode is disposed on the first surface of the polymer electrolyte membrane. The second electrode is disposed on the second surface of the polymer electrolyte membrane. The first electrode has planar dimensions larger than planar dimensions of the second electrode. The outer perimeter surface portion of the second surface of the polymer electrolyte membrane extends outward along the second surface from an end of the second electrode so as to be exposed from the second electrode. The resin frame member surrounds an outer perimeter of the polymer electrolyte membrane and includes an inner perimeter base end and an inner protruding portion. The inner protruding portion has a thickness and protrudes from the inner perimeter base end toward a second electrode side. The inner protruding portion includes a flat surface portion which extends to face the outer perimeter surface portion of the second surface of the polymer electrolyte membrane and on which an adhesive layer is provided so that the adhesive layer lies at least between the flat surface portion and the outer perimeter surface portion. The adhesive layer has a tapered shape in which a thickness of the adhesive layer increases from a tip of the inner protruding portion toward the inner perimeter base end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
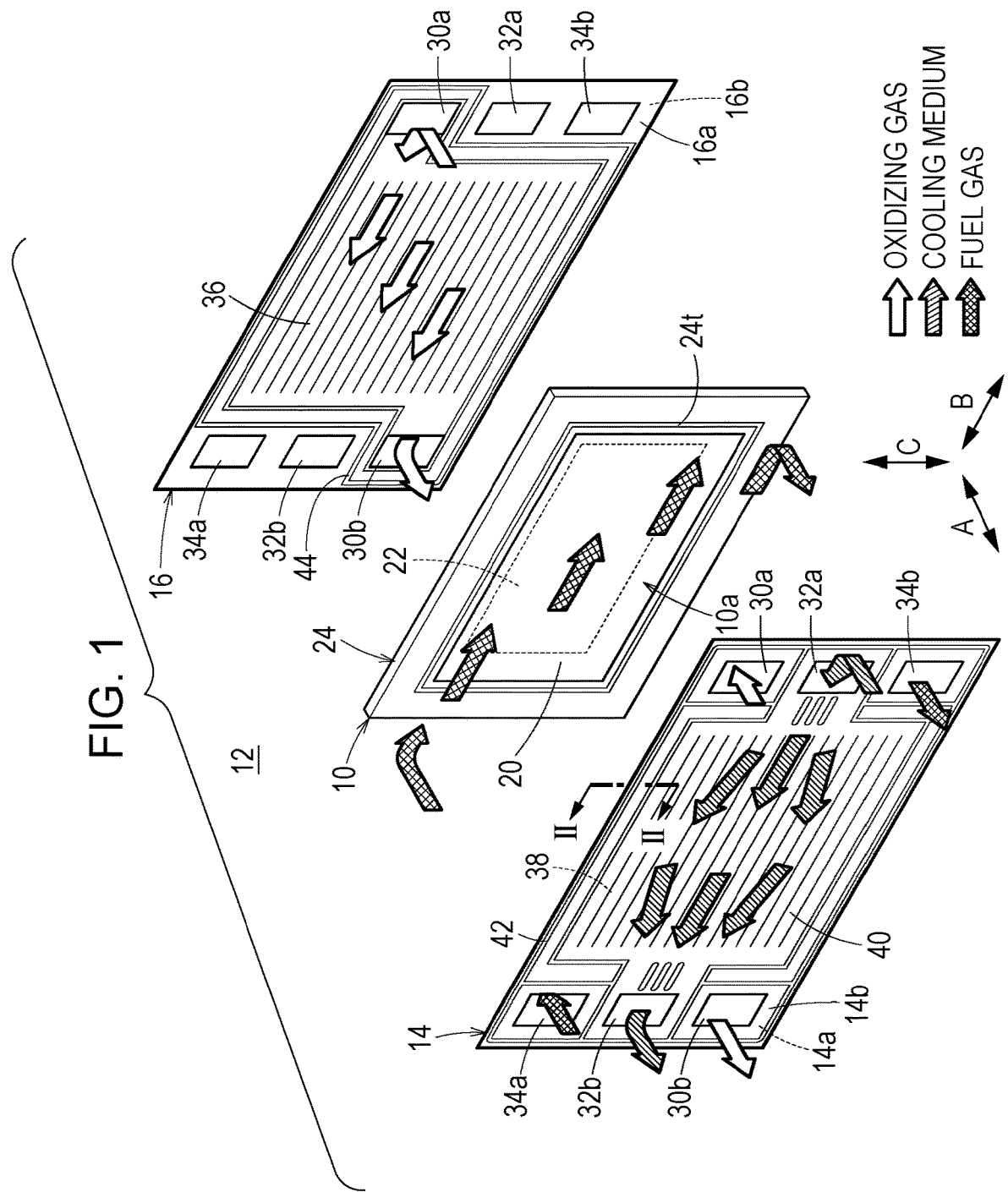
FIG. 1 is an exploded perspective view of a relevant part of a solid polymer electrolyte fuel cell that includes a resin-framed membrane-electrode assembly according to one embodiment.

The embodiments will now be described with reference to the accompanying drawings, wherein like reference numerals designate corresponding or identical elements throughout the various drawings.

Figure 2:
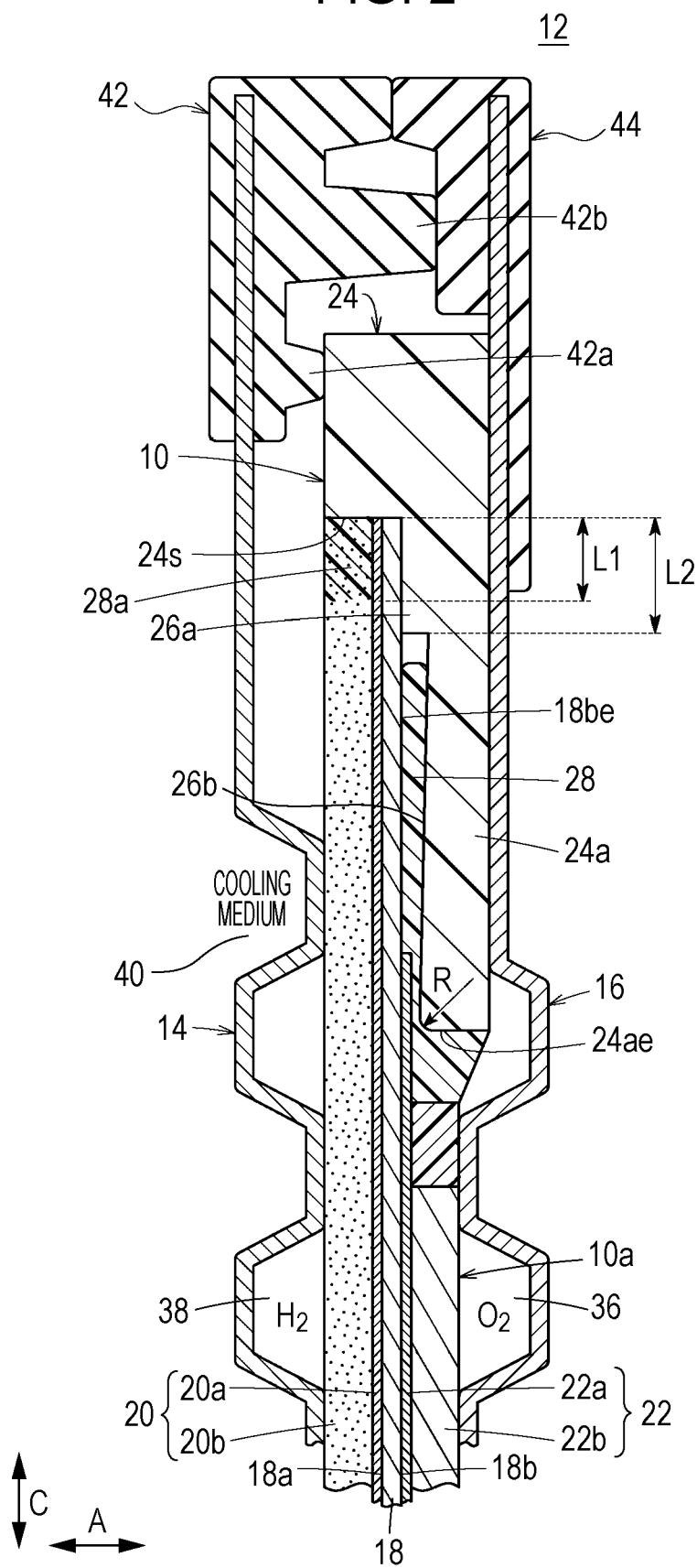
FIG. 2 is a cross-sectional view of the fuel cell taken along line II-II in FIG. 1.

As shown in FIGS. 1 and 2, a resin-framed membrane-electrode assembly 10 according to an embodiment of the present disclosure is built in a solid polymer electrolyte fuel cell 12 having a rectangular shape in landscape orientation (or portrait orientation). Two or more fuel cells 12 are stacked in, for example, the arrow A direction (horizontal direction) or arrow C direction (gravity direction) to form a fuel cell stack. The fuel cell stack is used as, for example, an onboard fuel cell stack to be mounted in a fuel cell electric vehicle (not shown in the drawings).

The fuel cell 12 includes the resin-framed membrane-electrode assembly 10 sandwiched between a first separator 14 and a second separator 16. The first separator 14 and the second separator 16 each have a rectangular shape in landscape orientation (or portrait orientation). The first separator 14 and the second separator 16 are, for example, each formed of a steel plate, a stainless steel plate, an aluminum plate, a plated steel sheet, a metal plate surface-treated to exhibit corrosion resistance, or a carbon part.

Figure 3:
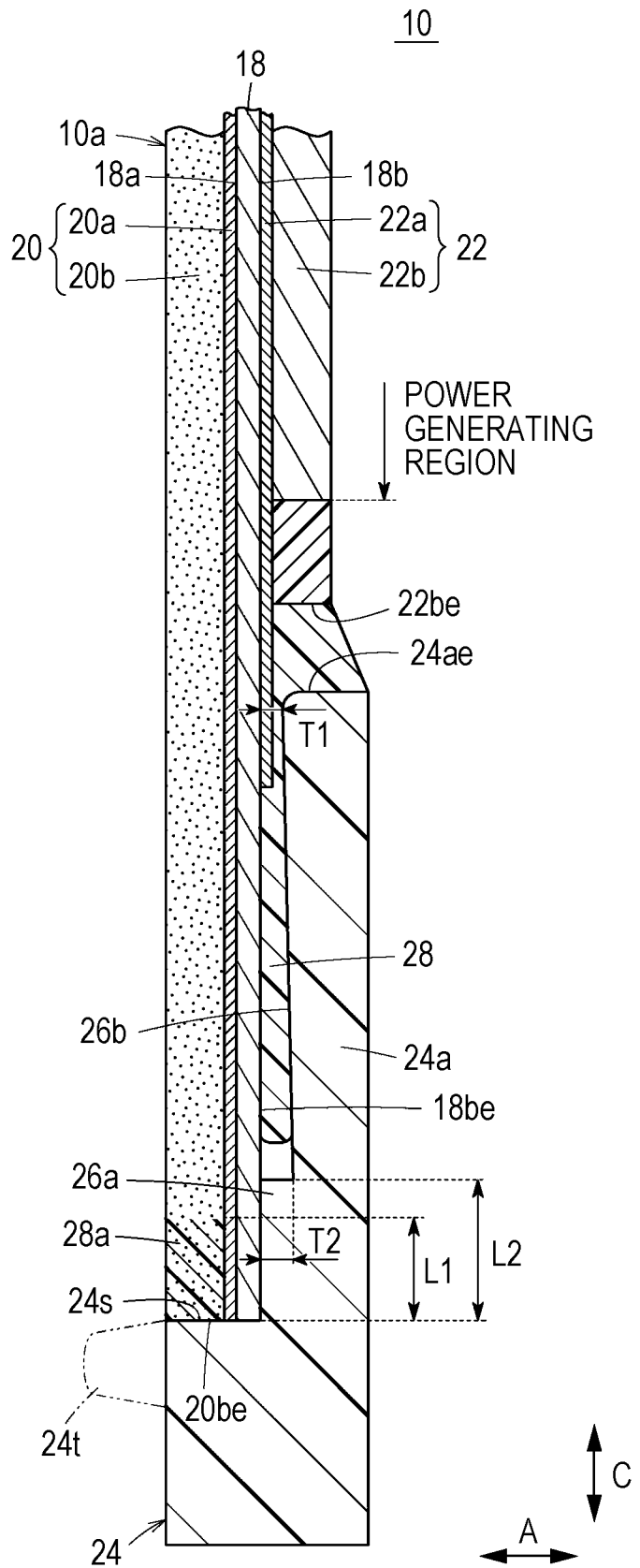
FIG. 3 is a cross-sectional view of a relevant part of the resin-framed membrane-electrode assembly.

As shown in FIGS. 1 to 3, the rectangular resin-framed membrane-electrode assembly 10 includes a membrane-electrode assembly 10a which is a stepped MEA. The membrane-electrode assembly 10a includes a polymer electrolyte membrane (cation exchange membrane) 18 constituted by a perfluorosulfonic acid thin membrane impregnated with water, for example. The polymer electrolyte membrane 18 is held between an anode electrode (first electrode) 20 and a cathode electrode (second electrode) 22. The polymer electrolyte membrane 18 may be a hydrocarbon (HC)-based electrolyte instead of the fluorine-based electrolyte.

The cathode electrode 22 has planar dimensions (size in a plan view or external dimensions) smaller than that of the polymer electrolyte membrane 18 and the anode electrode 20. Alternatively, the anode electrode 20 may be designed to have smaller planar dimensions than the polymer electrolyte membrane 18 and the cathode electrode 22. In such a case, the anode electrode 20 serves as a second electrode and the cathode electrode 22 serves as a first electrode.

The anode electrode 20 includes a first electrode catalyst layer 20a bonded to a surface 18a of the polymer electrolyte membrane 18, and a first gas diffusion layer 20b disposed on the first electrode catalyst layer 20a. The first electrode catalyst layer 20a and the first gas diffusion layer 20b are designed to have the same planar dimensions as each other and have the same planar dimensions as the polymer electrolyte membrane 18 (or may have smaller planar dimensions than the polymer electrolyte membrane 18).

The cathode electrode 22 includes a second electrode catalyst layer 22a bonded to a surface 18b of the polymer electrolyte membrane 18, and a second gas diffusion layer 22b disposed on the second electrode catalyst layer 22a. The second electrode catalyst layer 22a protrudes outward from an outer perimeter end portion 22be of the second gas diffusion layer 22b and has larger planar dimensions than the second gas diffusion layer 22b but smaller planar dimensions than the polymer electrolyte membrane 18. Alternatively, the second electrode catalyst layer 22a and the second gas diffusion layer 22b may be designed to have the same planar dimensions as each other.

The first electrode catalyst layer 20a is formed by uniformly coating a surface of the first gas diffusion layer 20b with porous carbon particles supporting a platinum alloy on their surfaces. The second electrode catalyst layer 22a is formed by uniformly coating a surface of the second gas diffusion layer 22b with porous carbon particles supporting a platinum alloy on their surfaces. The first gas diffusion layer 20b and the second gas diffusion layer 22b are each formed of carbon paper, carbon cloth, or any other suitable material. The planar dimensions of the second gas diffusion layer 22b are set to be smaller than the planar dimensions of the first gas diffusion layer 20b. The first electrode catalyst layer 20a and the second electrode catalyst layer 22a are respectively formed on two surfaces of the polymer electrolyte membrane 18, for example.

The resin-framed membrane-electrode assembly 10 includes a resin frame member 24 that surrounds the outer perimeter of the polymer electrolyte membrane 18 and is bonded to the anode electrode 20 and the cathode electrode 22. The resin frame member 24 is formed of, for example, polyphenylene sulfide (PPS), polyphthalamide (PPA), polyethylene naphthalate (PEN), polyether sulfone (PES), a liquid crystal polymer (LCP), polyvinylidene fluoride (PVDF), silicone rubber, fluorine rubber, ethylene propylene rubber (EPDM), or modified polyphenylene ether resin (m-PPE).

Figure 4:
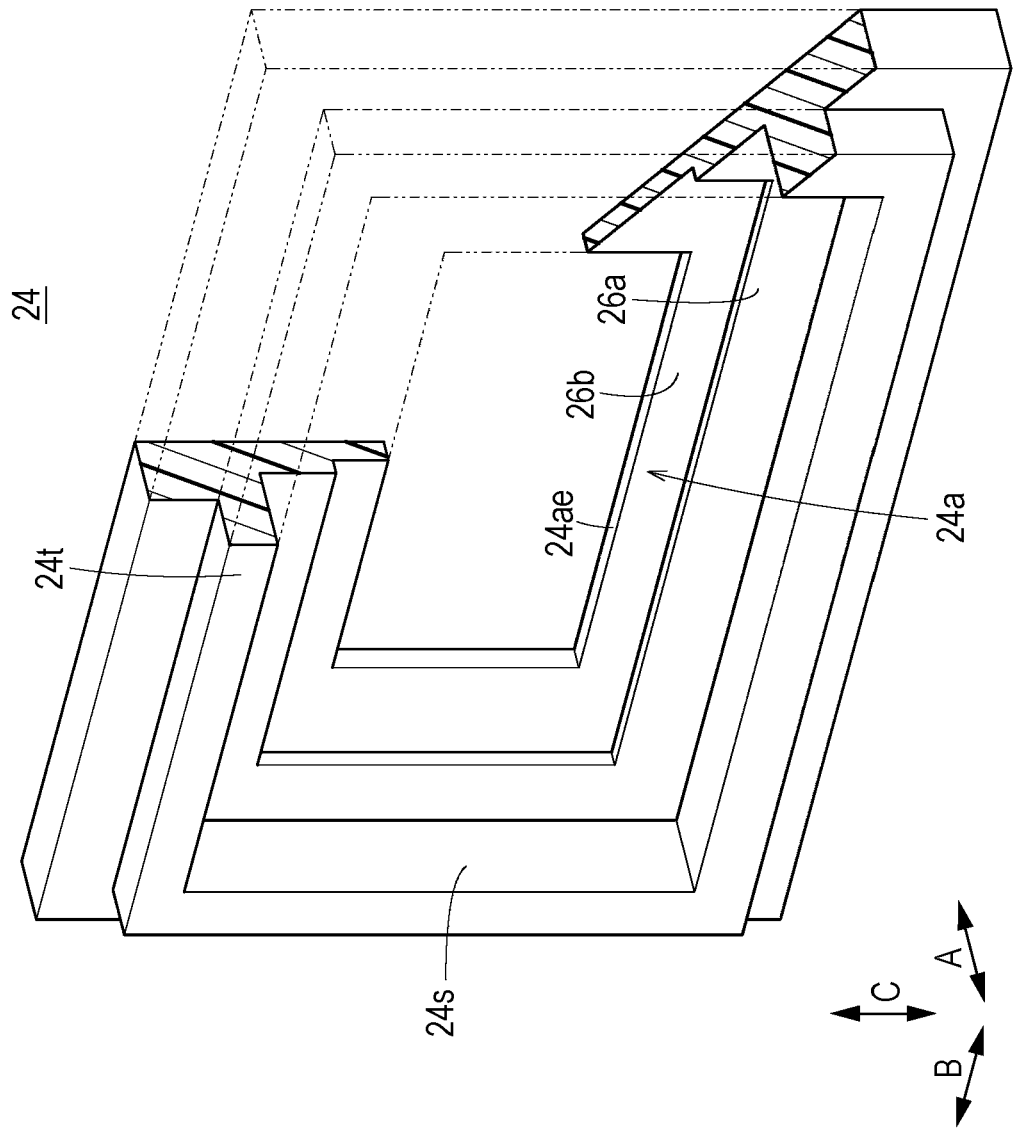
FIG. 4 is a partially cross-sectional perspective view of a resin frame member included in the resin-framed membrane-electrode assembly.

As shown in FIGS. 1 and 4, the resin frame member 24 has a frame shape. As shown in FIGS. 2 and 3, the resin frame member 24 has an inner protruding portion 24a that has a small thickness and protrudes from an inner perimeter base end 24s to lie on the cathode electrode 22 side of the polymer electrolyte membrane 18. The inner protruding portion 24a has a particular length from the inner perimeter base end 24s and overlays an outer perimeter surface portion 18be of the polymer electrolyte membrane 18.

The inner protruding portion 24a includes a raised portion 26a located near the inner perimeter base end 24s and is in contact with the outer perimeter surface portion 18be of the polymer electrolyte membrane 18. The outer perimeter surface portion 18be is the part that is exposed from the tip portion of the cathode electrode 22 outward in the surface direction. The raised portion 26a is integral with the inner protruding portion 24a. A flat surface portion 26b thinner than the raised portion 26a is formed at an inner end of the raised portion 26a. The flat surface portion 26b extends from the raised portion 26a to a tip 24ae of the inner protruding portion 24a. The inner corner of the tip 24ae has R (curved surface).

The flat surface portion 26b constitutes a tapered surface (tapered portion) that slopes from the tip 24ae of the inner protruding portion 24a toward the inner perimeter base end 24s so that the tapered surface becomes more and more distant from the outer perimeter surface portion 18be of the polymer electrolyte membrane 18 toward the inner perimeter base end portion 24s, in other words, so that the tapered surface slopes down in the thickness direction of the inner protruding portion 24a toward the inner perimeter base end portion 24s. Alternatively, a tapered surface (tapered portion) can be formed in the surface 18b of the polymer electrolyte membrane 18 of the membrane-electrode assembly 10a instead of forming a tapered surface in the flat surface portion 26b.

As shown in FIG. 3, the distance T1 between the flat surface portion 26b near the tip 24ae and the outer perimeter surface portion 18be of the polymer electrolyte membrane 18 is set to be smaller than the distance T2 between the flat surface portion 26b near the raised portion 26a and the outer perimeter surface portion 18be of the polymer electrolyte membrane 18 (T1<T2). An adhesive layer 28 having a tapered shape is formed between the flat surface portion 26b and at least the outer perimeter surface portion 18be of the polymer electrolyte membrane 18. The adhesive layer 28 has a tapered shape having a thickness gradually increasing from the tip 24ae toward the raised portion 26a (inner perimeter base end 24s).

Figure 5:
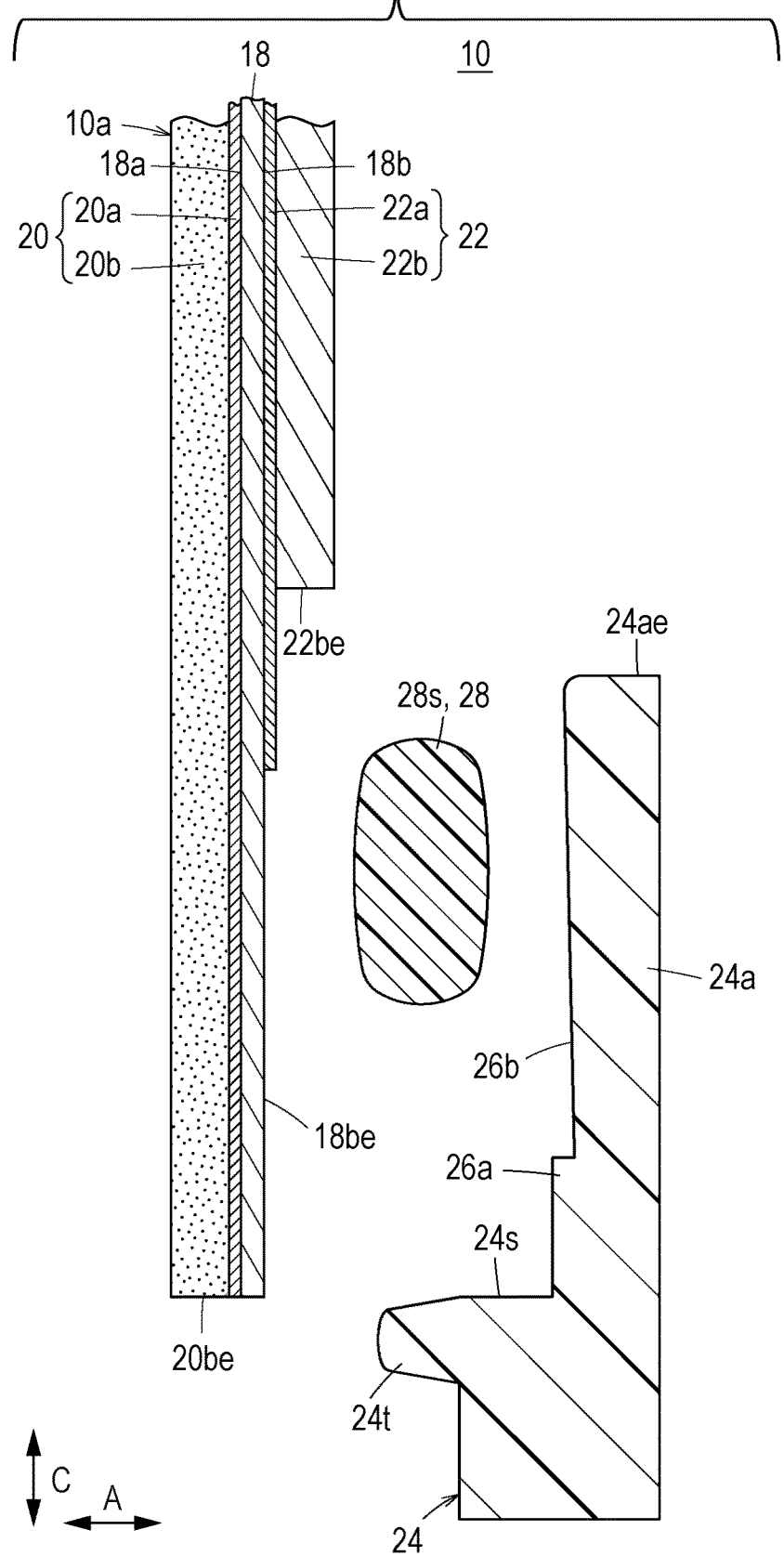
FIG. 5 is a diagram illustrating a method for producing the resin-framed membrane-electrode assembly.

The adhesive layer 28 is formed by using an adhesive 28s (see FIG. 5). Examples of the adhesive 28s include a liquid seal and a hot melt adhesive. The adhesive 28s may be of any type, for example, liquid, solid, thermoplastic, or thermosetting. The adhesive layer 28 is formed throughout the entire perimeter of the outer perimeter surface portion 18be of the polymer electrolyte membrane 18 and has a frame shape. The adhesive layer 28 is formed between the tip 24ae of the resin frame member 24 and the outer perimeter end portion 22be of the second gas diffusion layer 22b.

The resin frame member 24 is integral with a resin projection 24t adjacent to the inner perimeter base end 24s. As described below, the resin projection 24t forms a frame-shaped resin-impregnated portion 28a when the resin projection 24t is melted and impregnates the outer perimeter portion of the first gas diffusion layer 20b of the anode electrode 20. The width L1 of the resin-impregnated portion 28a is set to be smaller than the width L2 of the raised portion 26a of the inner protruding portion 24a (L1<L2).

The width L1 of the resin-impregnated portion 28a is the width of the region that extends inward in the surface direction from an outer perimeter end portion 20be of the first gas diffusion layer 20b of the anode electrode 20 and that is impregnated with the melt of the resin projection 24t. This region is positioned within the region where the raised portion 26a lies when viewed in the stacking direction.

As shown in FIG. 1, an oxidizing gas inlet manifold 30a, a cooling medium inlet manifold 32a, and a fuel gas outlet manifold 34b that are in communication with one another in the arrow A direction (stacking direction) are formed in one end portion of the fuel cell 12 in the arrow B direction (horizontal direction). Oxidizing gas, for example, oxygen-containing gas, is supplied through the oxidizing gas inlet manifold 30a, and a cooling medium is supplied through the cooling medium inlet manifold 32a. Fuel gas, for example, hydrogen-containing gas, is discharged through the fuel gas outlet manifold 34b. The oxidizing gas inlet manifold 30a, the cooling medium inlet manifold 32a, and the fuel gas outlet manifold 34b are aligned with one another in the arrow C direction (vertical direction).

A fuel gas inlet manifold 34a through which fuel gas is supplied, a cooling medium outlet manifold 32b through which a cooling medium is discharged, and an oxidizing gas outlet manifold 30b through which oxidizing gas is discharged are formed in the other end of the fuel cell 12 in the arrow B direction. The fuel gas inlet manifold 34a, the cooling medium outlet manifold 32b, and the oxidizing gas outlet manifold 30b are in communication with one another in the arrow A direction and are aligned with one another in the arrow C direction.

An oxidizing gas channel 36 in communication with the oxidizing gas inlet manifold 30a and the oxidizing gas outlet manifold 30b and extending in the arrow B direction is formed in a surface 16a of the second separator 16, the surface 16a facing the resin-framed membrane-electrode assembly 10.

A fuel gas channel 38 in communication with the fuel gas inlet manifold 34a and the fuel gas outlet manifold 34b and extending in the arrow B direction is formed in a surface 14a of the first separator 14, the surface 14a facing the resin-framed membrane-electrode assembly 10. A cooling medium channel 40 in communication with the cooling medium inlet manifold 32a and the cooling medium outlet manifold 32b and extending in the arrow B direction is formed between a surface 14b of the first separator 14 and a surface 16b of an adjacent second separator 16.

As shown in FIGS. 1 and 2, the surfaces 14a and 14b of the first separator 14 are integrated with a first sealing member 42 that surrounds the outer perimeter portion of the first separator 14. The surfaces 16a and 16b of the second separator 16 are integrated with a second sealing member 44 that surrounds the outer perimeter portion of the second separator 16.

As shown in FIG. 2, the first sealing member 42 includes a first protruding seal 42a in contact with the resin frame member 24 of the resin-framed membrane-electrode assembly 10, and a second protruding seal 42b in contact with the second sealing member 44 of the second separator 16. The second sealing member 44 has a surface in contact with the second protruding seal 42b and this surface constitutes a flat seal that extends along the surface of the separator and has a flat surface shape. Alternatively, instead of the second protruding seal 42b, a protruding seal (not shown) may be formed on the second sealing member 44.

The first sealing member 42 and the second sealing member 44 are each formed of an elastic sealing member, for example, a sealing material, a cushion material, or a packing material such as EPDM, NBR, fluorine rubber, silicone rubber, fluorosilicone rubber, butyl rubber, natural rubber, styrene rubber, chloroprene, or acrylic rubber.

Next, a method for producing a resin-framed membrane-electrode assembly 10 is described.

First, a membrane-electrode assembly 10a, which is a stepped MEA, is prepared, and a resin frame member 24 is formed by injection-molding by using a die (not shown). As shown in FIG. 4, the resin frame member 24 has an inner protruding portion 24a having a small thickness. The inner protruding portion 24a includes a raised portion 26a that protrudes from the inner perimeter base end 24s, and a flat surface portion 26b that is disposed at an inner end portion of the raised portion 26a and has a smaller thickness than the raised portion 26a. The resin frame member 24 is integral with the resin projection 24t adjacent to the inner perimeter base end 24s.

Next, as shown in FIG. 5, an adhesive 28s is disposed along an outer perimeter surface portion 18be of the polymer electrolyte membrane 18 of the membrane-electrode assembly 10a. The adhesive 28s may be a hot melt sheet. Alternatively, the adhesive 28s may be applied by using a dispenser not shown in the drawing.

Figure 6:
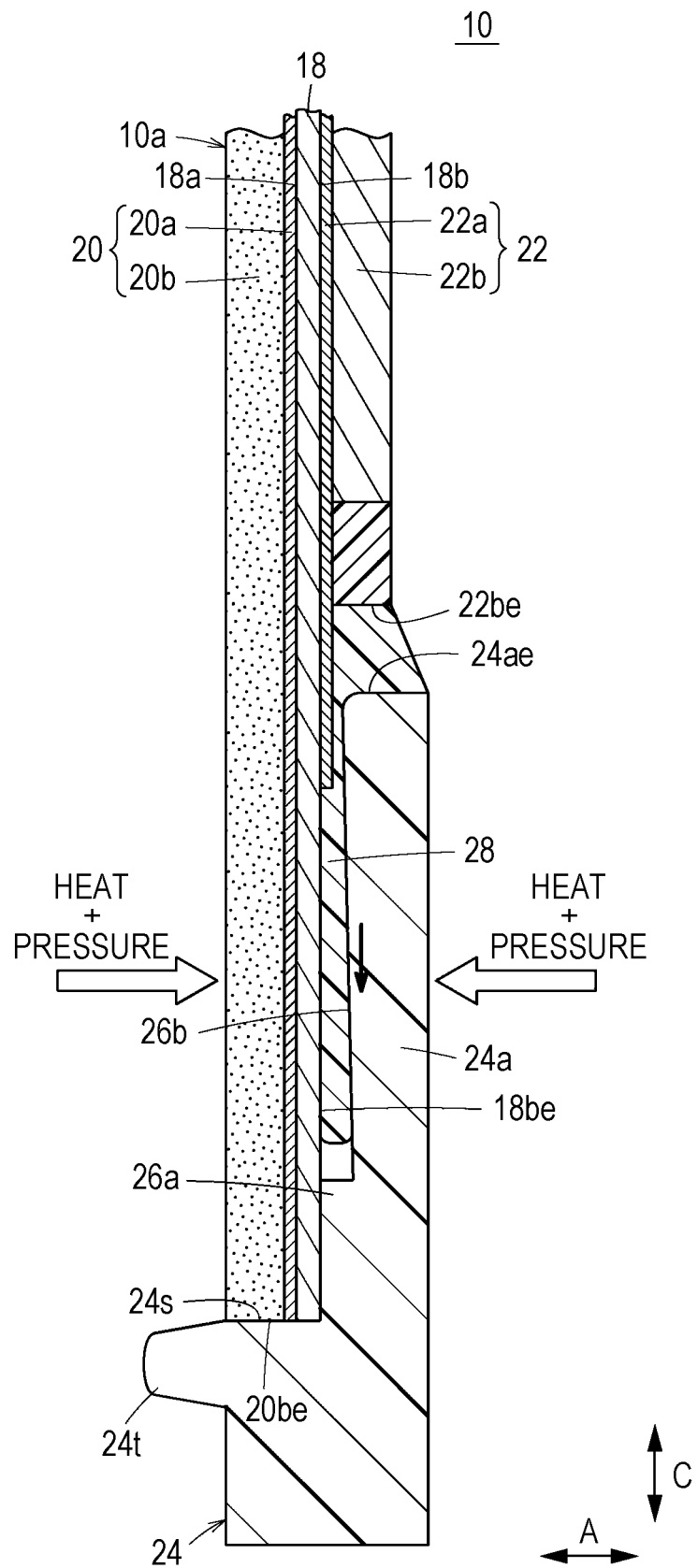
FIG. 6 is a diagram illustrating a method for producing the resin-framed membrane-electrode assembly.

The inner perimeter base end 24s of the resin frame member 24 is aligned with the outer perimeter end portion 20be of the first gas diffusion layer 20b of the membrane-electrode assembly 10a. The outer perimeter end portion 20be of the first gas diffusion layer 20b is superimposed on the raised portion 26a of the inner protruding portion 24a. As shown in FIG. 6, while the inner protruding portion 24a of the resin frame member 24 and the polymer electrolyte membrane 18 of the resin-framed membrane-electrode assembly 10 are being aligned with each other, the adhesive 28s is heated and melted and a load (for example, pressure) is applied in the thickness direction.

As a result, the inner protruding portion 24a of the resin frame member 24 becomes bonded to the outer perimeter surface portion 18be of the polymer electrolyte membrane 18 with the adhesive layer 28. The inner circumferential surface of the tip 24ae of the resin frame member 24 becomes bonded to the tip surface of the outer perimeter end portion 22be of the second gas diffusion layer 22b with the adhesive layer 28.

Figure 7:
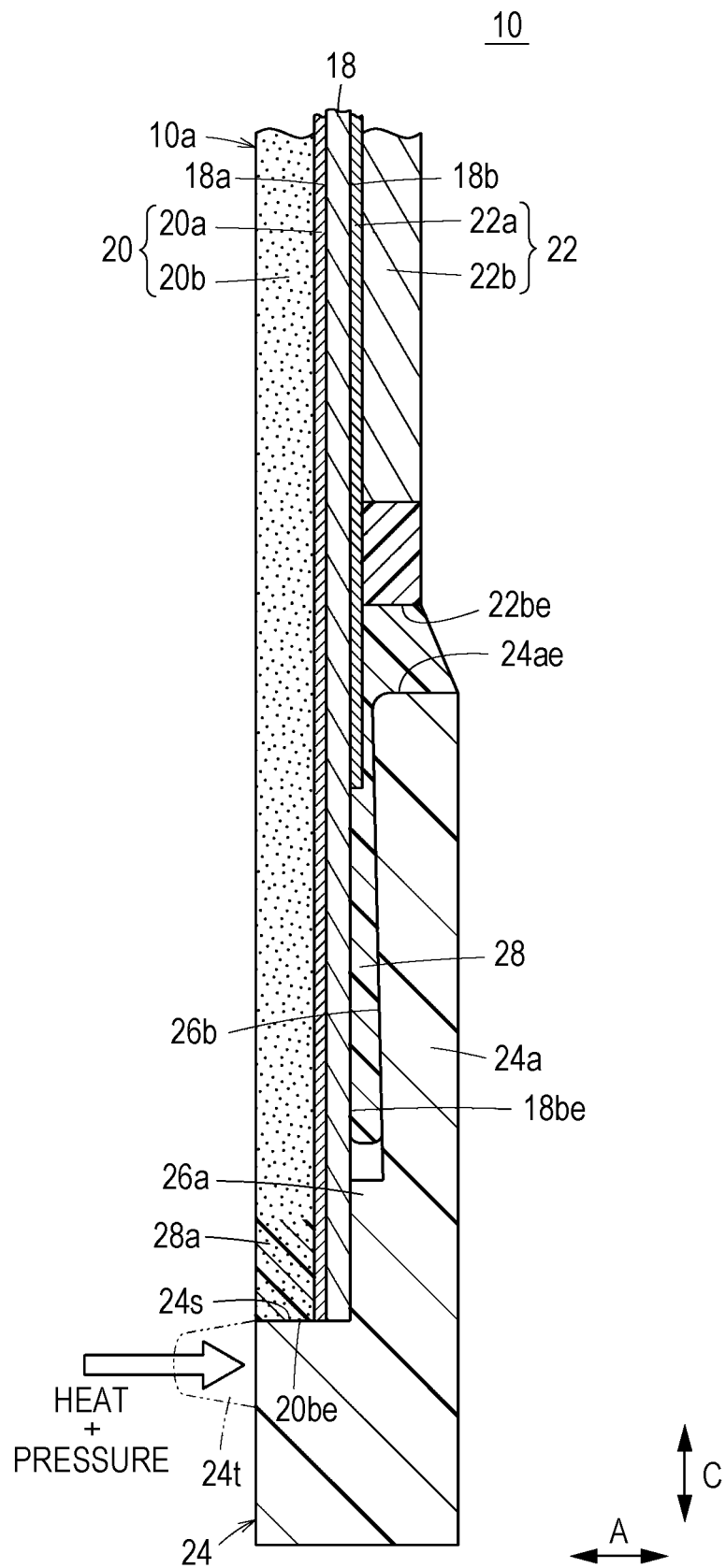
FIG. 7 is a diagram illustrating a method for producing the resin-framed membrane-electrode assembly.
Figure 8:
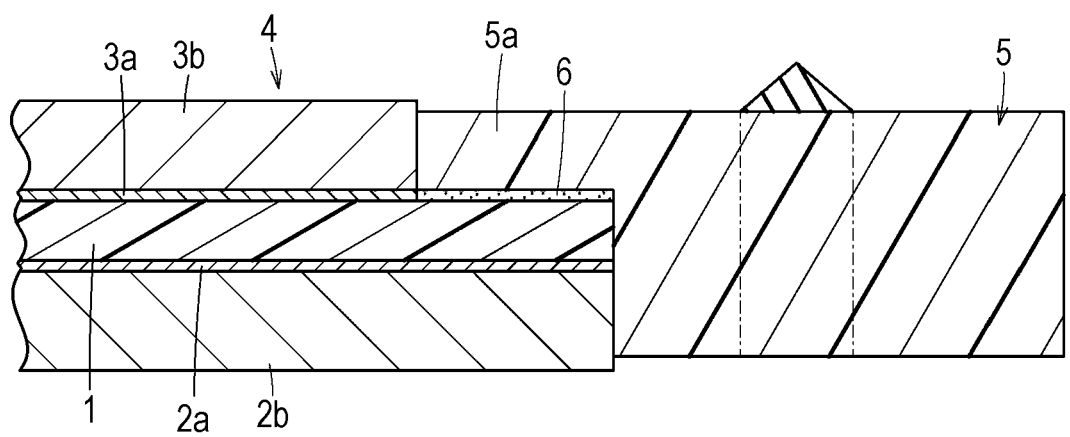
FIG. 8 is a diagram of a membrane-electrode assembly disclosed in Japanese Unexamined Patent Application Publication No. 2007-66766.

Next, as shown in FIG. 7, the resin projection 24t of the resin frame member 24 is heated and pressed by a die (not shown) that comes into contact. Examples of the heating method include laser heating, infrared heating, impulse heating, and heating with heaters. As a result, the resin projection 24t is heated and melted, and the melt of the resin projection 24t impregnates the first gas diffusion layer 20b of the anode electrode 20, thereby forming a resin-impregnated portion 28a. Thus, a resin-framed membrane-electrode assembly 10 is produced.

As shown in FIG. 2, the resin-framed membrane-electrode assembly 10 is held between the first separator 14 and the second separator 16. The second separator 16 is in contact with the inner protruding portion 24a of the resin frame member 24 and, together with the first separator 14, applies load onto the resin-framed membrane-electrode assembly 10. A desired number of fuel cells 12 are stacked to form a fuel cell stack and a clamping load is applied between end plates not shown in the drawing.

Operation of the fuel cell 12 having the above-described structure will now be described.

First, as shown in FIG. 1, oxidizing gas such as oxygen-containing gas is supplied through the oxidizing gas inlet manifold 30a, and fuel gas such as hydrogen-containing gas is supplied through the fuel gas inlet manifold 34a. A cooling medium such as pure water, ethylene glycol, or oil is supplied through the cooling medium inlet manifold 32a.

The oxidizing gas is introduced into the oxidizing gas channel 36 of the second separator 16 through the oxidizing gas inlet manifold 30a, travels in the arrow B direction, and reaches the cathode electrode 22 of the membrane-electrode assembly 10a. The fuel gas is introduced into the fuel gas channel 38 of the first separator 14 through the fuel gas inlet manifold 34a. The fuel gas travels in the arrow B direction along the fuel gas channel 38 and reaches the anode electrode 20 of the membrane-electrode assembly 10a.

The oxidizing gas supplied to the cathode electrode 22 and the fuel gas supplied to the anode electrode 20 are consumed by electrochemical reactions that occur in the second electrode catalyst layer 22a and the first electrode catalyst layer 20a of the membrane-electrode assembly 10a, and power is generated as a result.

The oxidizing gas supplied to and consumed in the cathode electrode 22 is then discharged through the oxidizing gas outlet manifold 30b in the arrow A direction. Similarly, the fuel gas supplied to and consumed in the anode electrode 20 is discharged through the fuel gas outlet manifold 34b in the arrow A direction.

The cooling medium supplied through the cooling medium inlet manifold 32a is introduced into a cooling medium channel 40 between the first separator 14 and the second separator 16 and flows in the arrow B direction. The cooling medium cools the membrane-electrode assembly 10a and then is discharged through the coolant outlet manifold 32b.

In this embodiment, as shown in FIGS. 2 and 3, the inner protruding portion 24a of the resin frame member 24 has a flat surface portion 26b on which the adhesive layer 28 having a tapered shape is formed. The flat surface portion 26b constitutes a tapered surface that slopes from the tip 24ae of the inner protruding portion 24a toward the inner perimeter base end 24s of the resin frame member 24 so that the tapered surface becomes more and more distant from the outer perimeter surface portion 18be of the polymer electrolyte membrane 18 toward the inner perimeter base end portion 24s.

Accordingly, as shown in FIG. 5, when the adhesive 28s disposed on the flat surface portion 26b is stretched toward the inner perimeter base end 24s, the adhesive 28s moves along the tapered surface that constitutes the flat surface portion 26b (see FIG. 6). The tapered surface becomes more distant from the outer perimeter surface portion 18be of the polymer electrolyte membrane 18 toward the inner perimeter base end 24s, and the capacity (volume) increases toward the inner perimeter base end 24s. Thus, air in the adhesive layer 28 can unfailingly move toward the inner perimeter base end 24s along with the flow of the adhesive 28s.

As a result, the membrane-electrode assembly 10a can be strongly and satisfactorily bonded to the resin frame member 24 by using a simple structure and generation of air bubbles inside the adhesive layer 28 can be minimized.

According to this embodiment, as shown in FIG. 3, the width L1 of the resin-impregnated portion 28a is set to be smaller than the width L2 of the raised portion 26a of the inner protruding portion 24a. Thus, as shown in FIG. 7, when the resin projection 24t of the resin frame member 24 is heated and pressed, the raised portion 26a functions as a load receiving member (back-supporting member). Thus, the resin projection 24t can be stably pressurized, and the desired resin-impregnated portion 28a can be satisfactorily and rapidly formed.

A resin-framed membrane-electrode assembly for a fuel cell according to an embodiment includes a stepped membrane-electrode assembly. The stepped membrane-electrode assembly includes a polymer electrolyte membrane, a first electrode disposed on a surface of the polymer electrolyte membrane, and a second electrode disposed on another surface of the polymer electrolyte membrane. The first electrode has planar dimensions larger than planar dimensions of the second electrode. A resin frame member surrounds an outer perimeter of the polymer electrolyte membrane.

The resin frame member has an inner protruding portion that has a small thickness and protrudes from an inner perimeter base end toward a second electrode side. The inner protruding portion includes a flat surface portion on which an adhesive layer is formed so that the adhesive layer lies between the flat surface portion and an outer perimeter surface portion of the polymer electrolyte membrane, the outer perimeter surface portion at least extending outward in a surface direction from an end of the second electrode so as to be exposed from the second electrode. The adhesive layer has a tapered shape in which a thickness increases from a tip of the inner protruding portion toward the inner perimeter base end of the inner protruding portion.

Preferably, a tapered portion is formed in the inner protruding portion of the resin frame member of the resin-framed membrane-electrode assembly.

Preferably, a resin projection for forming a resin-impregnated portion is formed at the inner perimeter base end so that a resin-impregnated portion is formed when the resin projection is melted and impregnates an outer perimeter portion of the first electrode. In such a case, preferably, a raised portion is formed in the inner protruding portion at a position near the inner perimeter base end so as to come into contact with the outer perimeter surface portion of the polymer electrolyte membrane. The raised portion is preferably designed so that a width dimension of the raised portion from the inner perimeter base end to the tip of the inner protruding portion is larger than a width dimension of the resin-impregnated portion.

According to this disclosure, a flat surface portion on which an adhesive layer is formed is included in the inner protruding portion of the resin frame member. The adhesive layer has a tapered shape in which a thickness of the adhesive layer increases from a tip of the inner protruding portion toward the inner perimeter base end of the inner protruding portion. Thus, the adhesive layer formed on the flat surface portion moves along the tapered shape when stretched toward the inner perimeter base end.

The tapered shape is formed from the tip of the inner protruding portion toward the inner perimeter base end, and thus the capacity (volume) of the adhesive layer increases toward the inner perimeter base end. Thus, air in the adhesive layer can unfailingly move toward the inner perimeter base end along with the flow of the adhesive.

As a result, the membrane-electrode assembly can be strongly and satisfactorily bonded to the resin frame member by using a simple structure, and generation of air bubbles inside the adhesive can be minimized.

Obviously, numerous modifications and variations of the present invention are possible in light of the above teachings. It is therefore to be understood that within the scope of the appended claims, the invention may be practiced otherwise than as specifically described herein.

What is claimed is:

1. A resin-framed membrane-electrode assembly for a fuel cell, comprising:
    a stepped membrane-electrode assembly comprising:
        a polymer electrolyte membrane having a first surface and a second surface which is opposite to the first surface and which has an outer perimeter surface portion;
        a first electrode disposed on the first surface of the polymer electrolyte membrane; and
        a second electrode disposed on the second surface of the polymer electrolyte membrane, the first electrode having planar dimensions larger than planar dimensions of the second electrode, the outer perimeter surface portion of the second surface of the polymer electrolyte membrane extending outward along the second surface from an end of the second electrode so as to be exposed from the second electrode; and
    a resin frame member surrounding an outer perimeter of the polymer electrolyte membrane and comprising:
        an inner perimeter base end; and
        an inner protruding portion having a thickness and protruding from the inner perimeter base end toward a second electrode side, the inner protruding portion including a raised portion and a flat surface portion which extends from the raised portion toward the second electrode side to face the outer perimeter surface portion of the second surface of the polymer electrolyte membrane and on which an adhesive layer is provided so that the adhesive layer lies at least between the flat surface portion and the outer perimeter surface portion, the adhesive layer having a tapered shape in which a thickness of the adhesive layer increases from a tip of the inner protruding portion toward the inner perimeter base end, the flat surface portion extending from the raised portion to the tip.

2. The resin-framed membrane-electrode assembly according to claim 1,
    wherein a tapered portion is provided in the inner protruding portion of the resin frame member.

3. The resin-framed membrane-electrode assembly according to claim 1,
    wherein the first electrode includes a first electrode catalyst layer provided on the first surface of the polymer electrolyte membrane and a first gas diffusion layer provided on the first electrode catalyst layer, and
    wherein the first electrode catalyst layer has planar dimensions equal to planar dimensions of the first gas diffusion layer and planar dimensions of the polymer electrolyte membrane.

4. The resin-framed membrane-electrode assembly according to claim 1,
    wherein the second electrode includes a second electrode catalyst layer provided on the second surface of the polymer electrolyte membrane and a second gas diffusion layer provided on the second electrode catalyst layer,
    wherein the second electrode catalyst layer protrudes outward along the second surface of the polymer electrolyte membrane from an outer perimeter end portion of the second gas diffusion layer, and
    wherein the second electrode catalyst layer has planar dimensions larger than planar dimensions of the second gas diffusion layer and smaller than planar dimensions of the polymer electrolyte membrane.

5. The resin-framed membrane-electrode assembly according to claim 1,
    wherein an inner corner of the tip of the inner protruding portion facing the second surface of the polymer electrolyte membrane has a curved surface.

6. A resin-framed membrane-electrode assembly for a fuel cell, comprising:
    a stepped membrane-electrode assembly comprising:
        a polymer electrolyte membrane having a first surface and a second surface which is opposite to the first surface and which has an outer perimeter surface portion;
        a first electrode disposed on the first surface of the polymer electrolyte membrane; and
        a second electrode disposed on the second surface of the polymer electrolyte membrane, the first electrode having planar dimensions larger than planar dimensions of the second electrode, the outer perimeter surface portion of the second surface of the polymer electrolyte membrane extending outward along the second surface from an end of the second electrode so as to be exposed from the second electrode; and a resin frame member surrounding an outer perimeter of the polymer electrolyte membrane and comprising:

an inner perimeter base end; and an inner protruding portion having a thickness and protruding from the inner perimeter base end toward a second electrode side, the inner protruding portion including a raised portion and a flat surface portion which extends from the raised portion toward the second electrode side to face the outer perimeter surface portion of the second surface of the polymer electrolyte membrane and on which an adhesive layer is provided so that the adhesive layer lies at least between the flat surface portion and the outer perimeter surface portion, the adhesive layer having a tapered shape in which a thickness of the adhesive layer increases from a tip of the inner protruding portion toward the inner perimeter base end, wherein a resin projection to provide a resin-impregnated portion is provided at the inner perimeter base end so that the resin-impregnated portion is provided in a case where the resin projection is melted to impregnate an outer perimeter portion of the first electrode with the resin projection which is melted, wherein the raised portion is provided in the inner protruding portion at a position in a vicinity of the inner perimeter base end so as to come into contact with the outer perimeter surface portion of the second surface of the polymer electrolyte membrane, and wherein the raised portion is designed so that a width dimension of the raised portion from the inner perimeter base end toward the tip of the inner protruding portion is larger than a width dimension of the resin-impregnated portion.

7. The resin-framed membrane-electrode assembly according to claim 6, wherein the first electrode includes a first electrode catalyst layer provided on the first surface of the polymer electrolyte membrane and a first gas diffusion layer provided on the first electrode catalyst layer, and wherein the outer perimeter portion of the first electrode is an outer perimeter portion of the first gas diffusion layer.

8. A resin-framed membrane-electrode assembly for a fuel cell, comprising:

a stepped membrane-electrode assembly comprising:

a polymer electrolyte membrane having a first surface and a second surface which is opposite to the first surface and which has an outer perimeter surface portion;

a first electrode disposed on the first surface of the polymer electrolyte membrane; and a second electrode disposed on the second surface of the polymer electrolyte membrane, the first electrode having planar dimensions larger than planar dimensions of the second electrode, the outer perimeter surface portion of the second surface of the polymer electrolyte membrane extending outward along the second surface from an end of the second electrode so as to be exposed from the second electrode; and a resin frame member surrounding an outer perimeter of the polymer electrolyte membrane and comprising:

an inner perimeter base end; and an inner protruding portion having a thickness and protruding from the inner perimeter base end toward a second electrode side, the inner protruding portion including a raised portion and a flat surface portion which extends from the raised portion toward the second electrode side to face the outer perimeter surface portion of the second surface of the polymer electrolyte membrane and on which an adhesive layer is provided so that the adhesive layer lies at least between the flat surface portion and the outer perimeter surface portion, the adhesive layer having a tapered shape in which a thickness of the adhesive layer increases from a tip of the inner protruding portion toward the inner perimeter base end, wherein the raised portion is provided adjacent to the inner perimeter base end to be in contact with the outer perimeter surface portion, and wherein the flat surface portion extends from the tip to the raised portion.

9. A resin-framed membrane-electrode assembly for a fuel cell, comprising:

a stepped membrane-electrode assembly comprising:

a polymer electrolyte membrane having a first surface and a second surface which is opposite to the first surface and which has an outer perimeter surface portion;

a first electrode disposed on the first surface of the polymer electrolyte membrane; and a second electrode disposed on the second surface of the polymer electrolyte membrane, the first electrode having planar dimensions larger than planar dimensions of the second electrode, the outer perimeter surface portion of the second surface of the polymer electrolyte membrane extending outward along the second surface from an end of the second electrode so as to be exposed from the second electrode; and a resin frame member surrounding an outer perimeter of the polymer electrolyte membrane and comprising:

an inner perimeter base end; and an inner protruding portion having a thickness and protruding from the inner perimeter base end toward a second electrode side, the inner protruding portion including a flat surface portion which extends to face the outer perimeter surface portion of the second surface of the polymer electrolyte membrane and on which an adhesive layer is provided so that the adhesive layer lies at least between the flat surface portion and the outer perimeter surface portion, the adhesive layer having a tapered shape in which a thickness of the adhesive layer increases from a tip of the inner protruding portion toward the inner perimeter base end, wherein a resin projection to provide a resin-impregnated portion is provided at the inner perimeter base end so that the resin-impregnated portion is provided in a case where the resin projection is melted to impregnate an outer perimeter portion of the first electrode with the resin projection which is melted, wherein a raised portion is provided in the inner protruding portion at a position in a vicinity of the inner perimeter base end so as to come into contact with the outer perimeter surface portion of the second surface of the polymer electrolyte membrane, and wherein the raised portion is designed so that a width dimension of the raised portion from the inner perimeter base end toward the tip of the inner protruding portion is larger than a width dimension of the resin-impregnated portion.

10. The resin-framed membrane-electrode assembly according to claim 9,
wherein the first electrode includes a first electrode catalyst layer provided on the first surface of the polymer electrolyte membrane and a first gas diffusion layer provided on the first electrode catalyst layer, and
wherein the outer perimeter portion of the first electrode is an outer perimeter portion of the first gas diffusion layer.

* * * * *